US010611990B1

(12) United States Patent
Azzaretto et al.

(10) Patent No.: US 10,611,990 B1
(45) Date of Patent: Apr. 7, 2020

(54) ACCELERATION OF ALCOHOLIC BEVERAGE MATURATION

(71) Applicant: 50 Fathoms, LLC, Santa Barbara, CA (US)

(72) Inventors: Emanuele Azzaretto, Ventura, CA (US); Kieran Maloney, Santa Barbara, CA (US)

(73) Assignee: 50 Fathoms, LLC, Santa Barbara, CA (US)

( * ) Notice: Subject to any disclaimer, the term of this patent is extended or adjusted under 35 U.S.C. 154(b) by 147 days.

(21) Appl. No.: 15/684,331

(22) Filed: Aug. 23, 2017

(51) Int. Cl.
*C12H 1/22* (2006.01)

(52) U.S. Cl.
CPC ..................... *C12H 1/22* (2013.01)

(58) Field of Classification Search
CPC .............. C12H 1/00; C12H 1/16; C12H 1/22
USPC .................... 99/277, 277.1, 277.2
See application file for complete search history.

(56) References Cited

U.S. PATENT DOCUMENTS

| | | | |
|---|---|---|---|
| 2,011,204 A | 4/1934 | Spang | |
| 2,031,232 A | 7/1934 | Spellmeyer | |
| 2,118,120 A | 5/1938 | Spang | |
| 5,860,353 A * | 1/1999 | Ceccarani | C12H 1/16 99/277.1 |
| 7,799,359 B2 * | 9/2010 | Bertuccioli | C12H 1/22 426/244 |
| 9,237,767 B2 * | 1/2016 | Fiset | A23L 3/28 |
| 2004/0137109 A1 * | 7/2004 | Guglielmi | C12H 1/16 426/11 |
| 2008/0233249 A1 * | 9/2008 | Bertuccioli | C12H 1/16 426/237 |
| 2010/0062120 A1 * | 3/2010 | Jang | C12H 1/16 426/234 |
| 2011/0143000 A1 * | 6/2011 | Fiset | A23L 3/28 426/248 |
| 2014/0314930 A1 * | 10/2014 | Nassief | C12H 1/22 426/519 |
| 2015/0184117 A1 * | 7/2015 | Stites | C12H 1/165 426/244 |
| 2016/0222333 A1 * | 8/2016 | Gillespie | C12H 1/22 |

OTHER PUBLICATIONS

Lersch, Martin, Khymos, "Accelerated aging of wine", http://blog.khymos.org/2009/02/02/accelerated-aging-of-wine/, Feb. 2, 2009, 5 pages.

(Continued)

*Primary Examiner* — Dana Ross
*Assistant Examiner* — Lawrence H Samuels
(74) *Attorney, Agent, or Firm* — Christopher P. Maiorana, PC (57) ABSTRACT

An apparatus includes an outer cage, an inner cage, and an array of electrodes. The outer cage generally comprises bars of a first material. The bars generally form a grid with a first spacing. The inner cage generally comprises a mesh of the first material. The inner cage is generally disposed within the outer cage and configured to hold a plurality of bottles in a stacked arrangement. The mesh generally comprises a grid with a second spacing smaller than the first spacing. The array of electrodes generally comprises a second material and is generally disposed within the inner cage. The array of electrodes is generally configured to separate the bottles, when stacked in the inner cage, into at least two groups.

20 Claims, 5 Drawing Sheets

(56) References Cited

OTHER PUBLICATIONS

Zeng, Xin An, "The effects of AC electric field on wine maturation", http://www.sciencedirect.com/science/article/pii/S1466856408000349. Innovative Food Science & Emerging Technologies, vol. 9, Issue 4, Oct. 2008, 1 page.

Arthur, Rachel, "An underwater cellar: Californian winery ages wine under the sea", www.beveragedaily.com, Jan. 15, 2015, 1 page.

* cited by examiner

ACCELERATION OF ALCOHOLIC BEVERAGE MATURATION

FIELD OF THE INVENTION

The invention relates to beer, wine, and spirit production generally and, more particularly, to a method and/or apparatus for implementing acceleration of alcoholic beverage maturation.

BACKGROUND

Based on the history of the wine industry, it is accepted practice to put wines and/or spirits in a warehouse or cellar to allow the wine or spirit to age (or mature). During the aging process, the temperature and humidity of the warehouse or cellar need to be maintained. The conventional aging process can take a long time, which can result in significant costs.

It would be desirable to implement acceleration of wine and spirit aging.

SUMMARY

The invention concerns an apparatus including an outer cage, an inner cage, and an array of electrodes. The outer cage generally comprises bars of a first material. The bars generally form a grid with a first spacing. The inner cage generally comprises a mesh of the first material. The inner cage is generally disposed within the outer cage and configured to hold a plurality of bottles in a stacked arrangement. The mesh generally comprises a grid with a second spacing smaller than the first spacing. The array of electrodes generally comprises a second material and is generally disposed within the inner cage. The array of electrodes is generally configured to separate the bottles, when stacked in the inner cage, into at least two groups.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a method and/or apparatus for implementing acceleration of alcoholic beverage maturation that may (i) allow bottles containing alcoholic beverages to be submerged in a seawater environment, (ii) protect the bottles containing alcoholic beverages from damage, (iii) facilitate recovery of the bottles containing alcoholic beverages from the seawater environment, (iv) allow the bottles containing alcoholic beverages to be moved by ocean currents, (v) allow the bottles containing alcoholic beverages to gently rub together, (vi) setup galvanic current paths within which the bottles containing alcoholic beverages are located, and/or (vi) be used in wine, beer, and/or spirit production.

Figure 1:
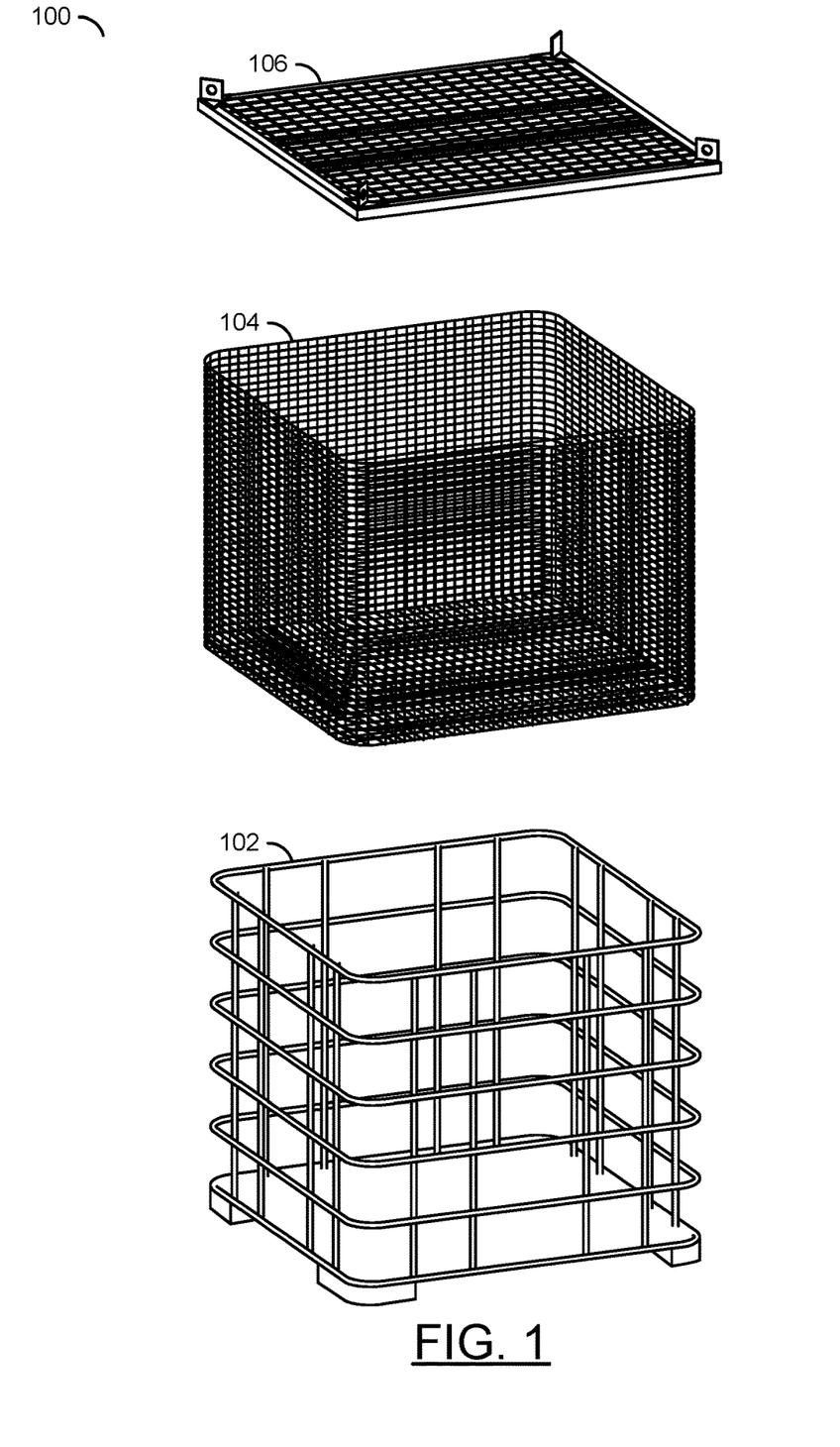
FIG. 1 is a diagram illustrating a example enclosure in accordance with an embodiment of the invention.

Referring to FIG. 1, a diagram is shown illustrating an example enclosure in accordance with an embodiment of the invention. In various embodiment, an enclosure (or cage) 100 may be configured to hold a plurality of bottles of alcoholic beverages (e.g., wine, beer, spirits, etc.) and facilitate exposure of the bottles to a seawater environment and a galvanic ocean current. In various embodiments, the enclosure 100 may comprise an outer cage 102, and inner cage 104, and a top 106. When assembled, the enclosure 100 may completely encase several cases of bottles containing various beverages and/or liquids (e.g., wine, beer, spirits, olive oil, etc.). In various embodiments, the inner cage 104 is configured to fit within the outer cage 102 and the top 106 is configured to complete both the inner and outer cages. In an example, the top 106 may be secured to the outer cage 102 and inner cage 104 using ratcheted cargo straps. In another example, the top 106 may be secured to the outer cage 102 and inner cage 104 using nuts and bolts. However, other methods of securing the top 106 to the outer cage 102 and inner cage 104 may be used to meet the design criteria of a particular implementation.

In an example embodiment, the enclosure 100 may be manufactured using a non-galvanized metallic material (e.g., steel, etc.). In an example, the outer cage 102 may comprise 1-inch metallic pipes (or conduits, or rods, or bars, etc.) creating a structure with large (e.g., 1 foot square) openings. In an example, the outer cage 102 may be configured as a cubical structure. In an example, the inner cage 104 may comprise a mesh (e.g., wire mesh) having a grid of small (e.g., one-quarter inch) squares. The top 106 may have a metallic frame with an inner heavy gage wire mesh. The inner heavy gage wire mesh may comprise a grid of somewhat larger (e.g., 1-inch) squares.

In various embodiments, the enclosure 100 also includes an electrode (or anode) assembly (e.g., described below in connection with FIG. 2). An electrode is an electrically conductive material used to make contact with a non-metallic part of a circuit (e.g., a semiconductor, an electrolyte, etc.). An electrode associated with a positive pole of a circuit is generally referred to as an anode, while the electrode associated with a negative pole is generally referred to as a cathode. The implementation of the electrode (or anode) assembly in accordance with embodiments of the invention is generally different from the use of sacrificial anodes in marine applications. In marine environments, galvanic corrosion can damage or destroy underwater metal parts (e.g., propeller shafts, etc.) of boats, dock hardware, and other equipment. A conventional technique for preventing galvanic corrosion of exposed metal parts in the marine environment is to form a galvanic couple by connecting the metal part (e.g., propeller shaft) to a sacrificial anode made from zinc, aluminum, or magnesium. In such applications, bolting the sacrificial anode to the exposed metal part alters the location of corrosion due to an electrical circuit between the protected metal part and other exposed metal parts, thus preventing corrosion of the protected part.

In contrast to boat applications, the electrode (or anode) assembly in accordance with various embodiments of the invention is located centrally in the inner cage 104, rather than directly bolted directly to the inner cage 104. The centrally located anode assembly may facilitate the galvanic current to be directed toward the center of the enclosure 100, thus ensuring the galvanic current path passes around/ across/over the bottles that are stacked within the inner cage 104. The bottles are generally stacked together to provide contact with each other rather than held apart in a framework. Having the bottles touch one another generally allows currents in the water to move the bottles against one another, creating friction that may result in a triboelectric charge on the glass of the bottles and/or vibration of the contents of the bottles. Particular mineral content of the glass used in the bottles may affect the friction and vibration properties of the glass bottles.

Figure 2:
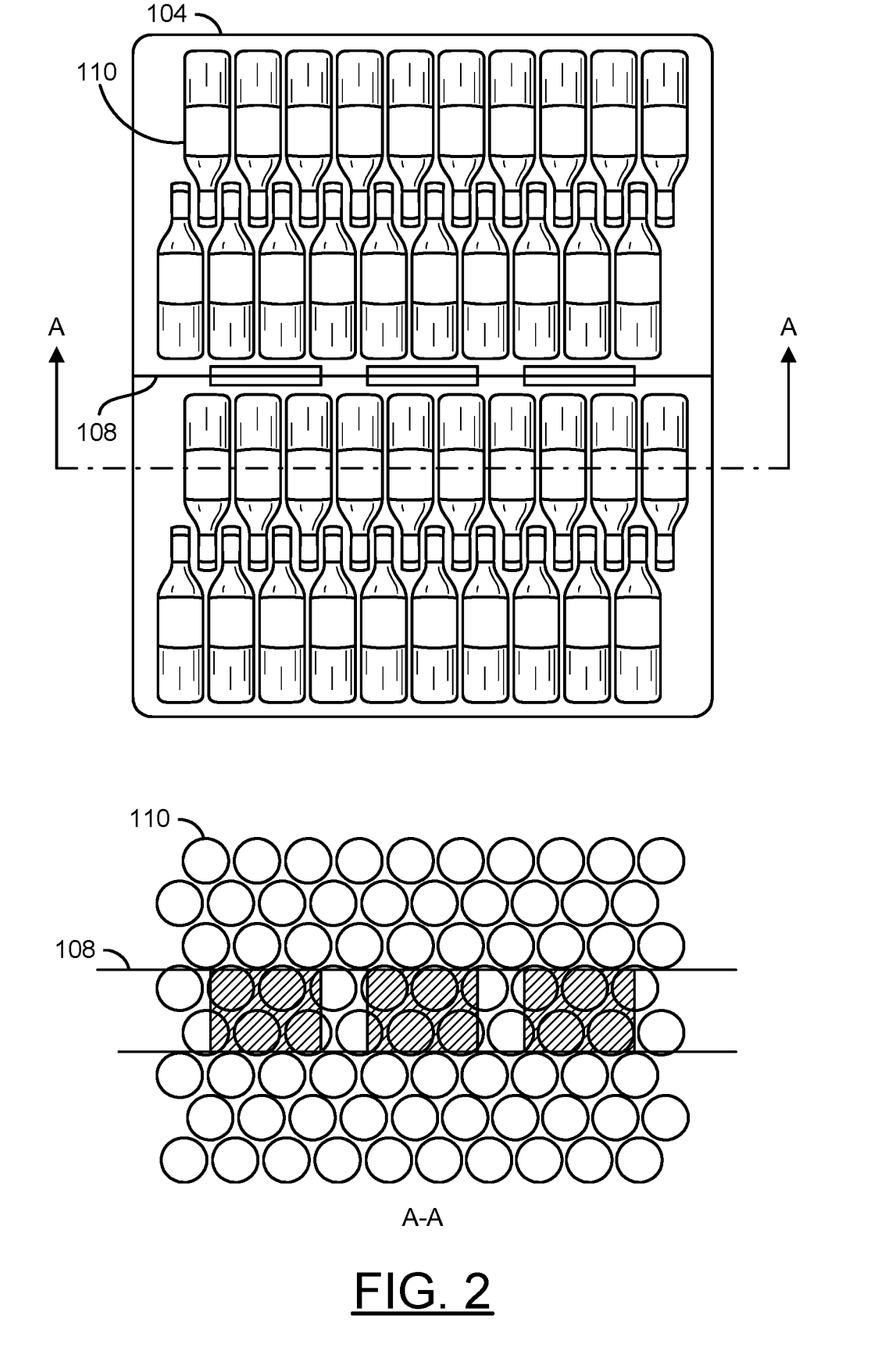
FIG. 2 is a diagram illustrating a top and lateral views of bottles stacked within the enclosure of FIG. 1.

Referring to FIG. 2, a diagram is shown illustrating a top view and a cross-sectional view A-A of an example arrangement of the electrode assembly and stacked bottles within the enclosure 100 of FIG. 1. In various embodiments, an electrode (or anode) assembly 108 is disposed centrally within the inner cage 104. In an example, the electrode assembly 108 is mounted centrally between two opposing sides of the inner cage 104. A plurality of bottles 110 may be stacked between the electrode (or anode) assembly 108 and sides of the inner cage 104. In various embodiments, the electrode assembly 108 may be configured to separate the plurality of bottles 110 into at least two groups.

The cross-sectional view A-A generally illustrates the bottles 110 stacked on top of one another to allow the bottles 110 to rub against one another in response to the seawater motion due to currents and/or tides. The shifting of the bottles 110 with the seawater motion and glass-on-glass rubbing may create vibrations that may help with preventing sedimentation in the bottles 110. In an example, the bottles 110 may have labels comprising a waterproof material. In an example, the glass-on-glass and label-on-glass rubbing may create triboelectric (e.g., static electricity) effects that may affect aging of the contents of the bottles 110. The bottles 110 are generally stacked so that a long axis of the bottles 110 is perpendicular to front and back faces (areas) of the electrode assembly 108. The arrangement of the bottles 110 relative to the electrode assembly 108 may enhance an ability of an electric field formed by the galvanic current to affect the maturation of the contents of the bottles 110. Depending upon a relative size of the enclosure 100 and the electrode plates of the electrode assembly 108, there may be only one row of electrode plates, or there may be multiple (e.g., two or more) rows of electrode plates.

Figure 3:
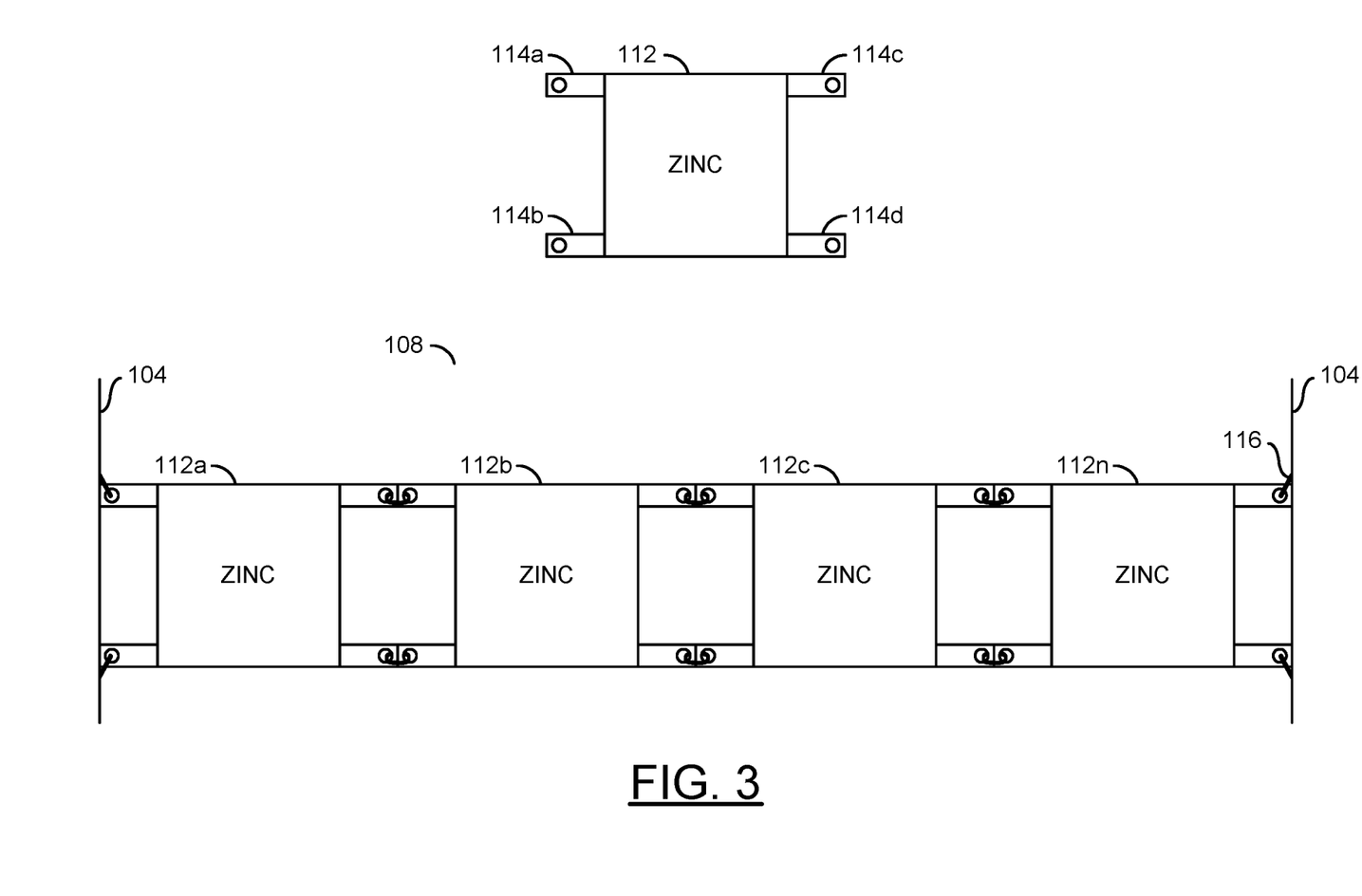
FIG. 3 is a diagram illustrating an example of an electrode array in accordance with an embodiment of the invention.

Referring to FIG. 3, a diagram is shown illustrating an example implementation of the electrode assembly 108 in accordance with an embodiment of the invention. In an example, the electrode assembly 108 may comprise a plurality of electrode plates 112a-112n. Each of the electrode plates 112a-112n may comprise a galvanic metallic material (e.g., zinc, galvanized steel, aluminum, etc.). Each of the electrode plates 112a-112n may have four attachment points 114a-114d. In an example, the attachment points 114a-114d may be implemented using ends of a pair of steel rods (or bars) around which the respective electrode plate 112 is formed. In an example, molten zinc may be molded around a pair of steel rods to form each of the electrode plates 112a-112n.

The attachment points 114a-114d may be configured to couple each electrode plate 112 to another electrode plate 112 and/or to the inner cage 104 of the enclosure 100 (e.g., using ties 116). In an example, the attachment points 114a-114d may be used to electrically connect the electrode plates to the inner cage 104. For example, conductive (e.g., metallic, etc.) ties 116 may be used to assemble the electrode plates 112a-112n to one another and to the inner cage 104. In another example, non-conductive (e.g., Nylon, etc.) ties 116 may be used to assemble the electrode plates 112a-112n to one another and to the inner cage 104. In embodiments using non-conductive ties 116, the electrode assembly 108 may be electrically coupled to the inner cage 104 by a wire or some other conductive path.

Figure 4:
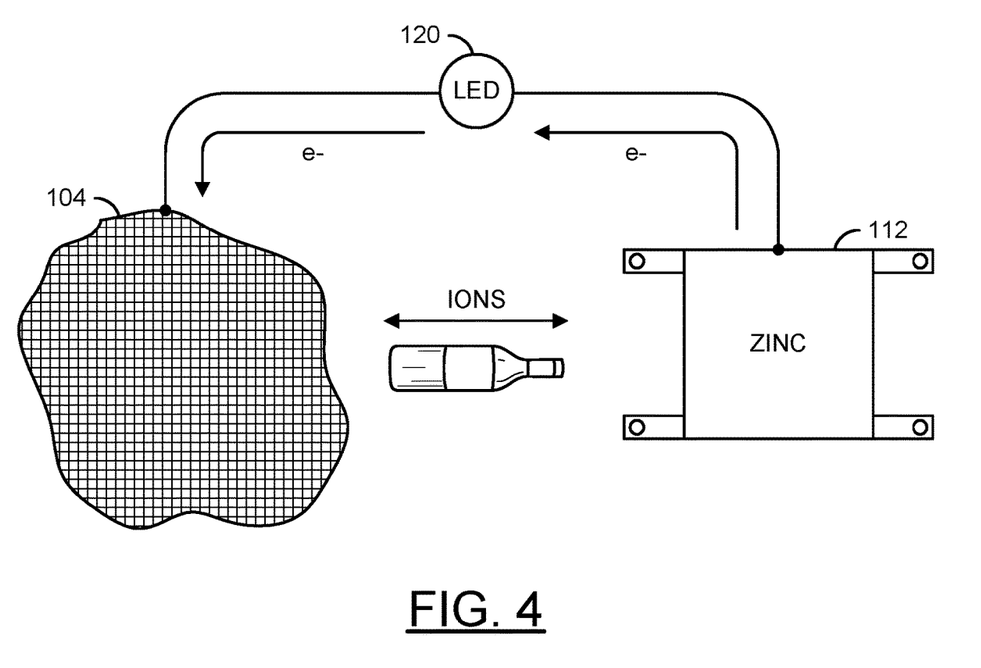
FIG. 4 is a diagram illustrating an example galvanic current path formed by the enclosure and electrode array in accordance with an embodiment of the invention.

Referring to FIG. 4, a diagram is shown illustrating an example galvanic circuit in accordance with an embodiment of the invention. In various embodiments, a galvanic circuit may be formed by electrically connecting the inner cage 104 and the electrode assembly 108. In an example, an electrically conductive material (e.g., wire strap, etc.) may be configured to electrically connect the inner cage 104 and the electrode assembly 108. In another example, an optional light emitting device 120 may be configured to electrically connect the inner cage 104 and the electrode assembly 108.

When the enclosure 100 is submerged in seawater, the inner cage 104 and the electrode assembly 108 may produce an electric current that may passed through the electrically conductive connection between the inner cage 104 and the electrode assembly 108 or through the light emitting device 120. The electrical circuit may be completed by ions flowing between the inner cage 104 and the electrode assembly 108 through the seawater. The ion flow may driven by an electric field created between the inner cage 104 and the electrode assembly 108. The electric field may also affect molecules having charges within the bottles 110.

In an example, the light emitting device 120 may assist in locating the enclosure 100 when submerged in murky water. In an example, the light emitting device 120 may be implemented using a light emitting diode (LED) bulb. In another example, the light emitting device 120 may be implemented as a strobe (or beacon). In still another example, the light emitting device 120 may be implemented as part of a buoy attached to the enclosure 100 (described in more detail below in connection with FIG. 5).

Metallic materials in electrochemical contact can form a galvanic cell, or battery. In a galvanic cell, when two metals with different electrical potentials are connected, a potential difference is formed across the two metals. The more noble metal becomes the cathode and the more active metal becomes the anode. A measurable galvanic current may flow between the anode and the cathode. If this occurs, the rate of corrosion of the anode in the service environment will be increased while the corrosion rate of the cathode will decrease.

The galvanic current is a constant and direct current (DC) having a safe, low-voltage level. Chemical changes are produced when the current is passed through certain solutions containing acids and salts. The anode (or electrode) assembly generally dissolves, decays, or corrodes, to form ions. These ions drift into the water where they either stay in solution or react with other ions in the water. This process is known as galvanic corrosion. The higher the salinity and temperature of the water, the greater the likelihood of corrosion. In an example, the electrode assembly may be reduced in size by half over a period of a year. Because of the rate of corrosion, the enclosure 100 and the electrode assembly 108 generally need to be inspected and/or replaced between uses. In an example, a new enclosure 100 and electrode assembly 108 may be used for each aging cycle to ensure best performance.

In order for galvanic corrosion to occur, three elements are needed: (1) two metals with different corrosion potentials, (2) direct metal-to-metal electrical contact, and (3) a conductive electrolyte solution (e.g. seawater) connecting the two metals on a regular basis. The electrolyte solution creates a "conductive path." This could occur when there is regular immersion, condensation, rain, fog exposure or other sources of moisture that dampen and connect the two metals.

If any of these elements is missing, galvanic corrosion cannot occur. If, for example, the direct contact between the two metals is prevented (e.g., plastic washer, paint film, etc.) or if there is some other interruption in the conductive path, there cannot be galvanic corrosion and each metal will corrode at its normal rate in the particular service environment.

In addition to the three elements referred to above, the relative surface area (not mass) of each of the exposed metals is also an important factor. If the area of the cathode (noble metal) is very large, and the anode (active metal) is very small, the current produced is likely to be very high and the anode will corrode quickly. In the enclosure 100, the outer cage 102 and the inner cage 104 act as the cathode and the electrode plates 112 act as the anode. Thus, the particular galvanic current generated by the enclosure 100 may be controlled by adjusting the relative surface areas of the first material making up the enclosure 100 and the second material making up the electrode assembly 108.

For example, if the enclosure is made of stainless steel, the electrode assembly is made with carbon steel, and the surface area of the stainless steel enclosure is significantly larger than the surface area of the electrode assembly, the electrode assembly will probably corrode at an accelerated rate. If the area of the enclosure (noble metal-stainless steel) is very small, and the electrode assembly (active metal-carbon steel) is very large, the current produced will be very low and the corrosion rate of the anode may not be affected.

When two different metals are coupled together in atmosphere or water, the likelihood of developing galvanic corrosion can be predicted using a "galvanic series." The seawater Galvanic Sequence lists metals in order, based on the voltage potential they exhibit and tendency to corrode in flowing seawater. More active metals, the faster-dissolving anodes, are at the top of the series. Passive metals, the cathodes, are located at the bottom. Table 1 (below) shows a galvanic series measured in seawater for some common metals and alloys.

TABLE 1

| REACTIVITY | MATERIAL |
| --- | --- |
| Most | Magnesium |
| reactive | Zinc |
| (Anodic) | Aluminum (most types) |
|  | Iron, plain carbon and low alloy steels |
|  | Lead, high lead alloys |
| . | Tin plate, tin/lead solder |
| . | Chromium plated material, chromium |
| . | alloy, chromium type steels |
|  | Brass |
|  | Nickel |
| Least | Stainless steels |
| reactive | Silver |
| (Cathodic) | Gold |

When two metals are further apart in the list (e.g. a larger difference between the two numbers), the driving force for galvanic corrosion is increased. The most anodic (active) metals are at the top and most cathodic (noble) at the bottom. For example, if zinc (e.g., galvanized steel) which is an active material and near the top of the list and stainless steel, a noble metal and near the bottom of the list were in direct contact and in the presence of an electrolyte (water), galvanic corrosion will occur if they are regularly exposed to the electrolyte.

Zinc and cadmium are elements used in traditional saltwater anodes. However, alternative electrode materials may be implemented that remove these alloys for safer and/or more "green" anodes. In an example, an anode may be implemented that does not include cadmium and contains a fraction of the zinc used in making conventional zinc anodes. In an example, aluminum and indium, which are considered non-toxic, may be used to implement the electrode plates 112a-112n.

Figure 5:
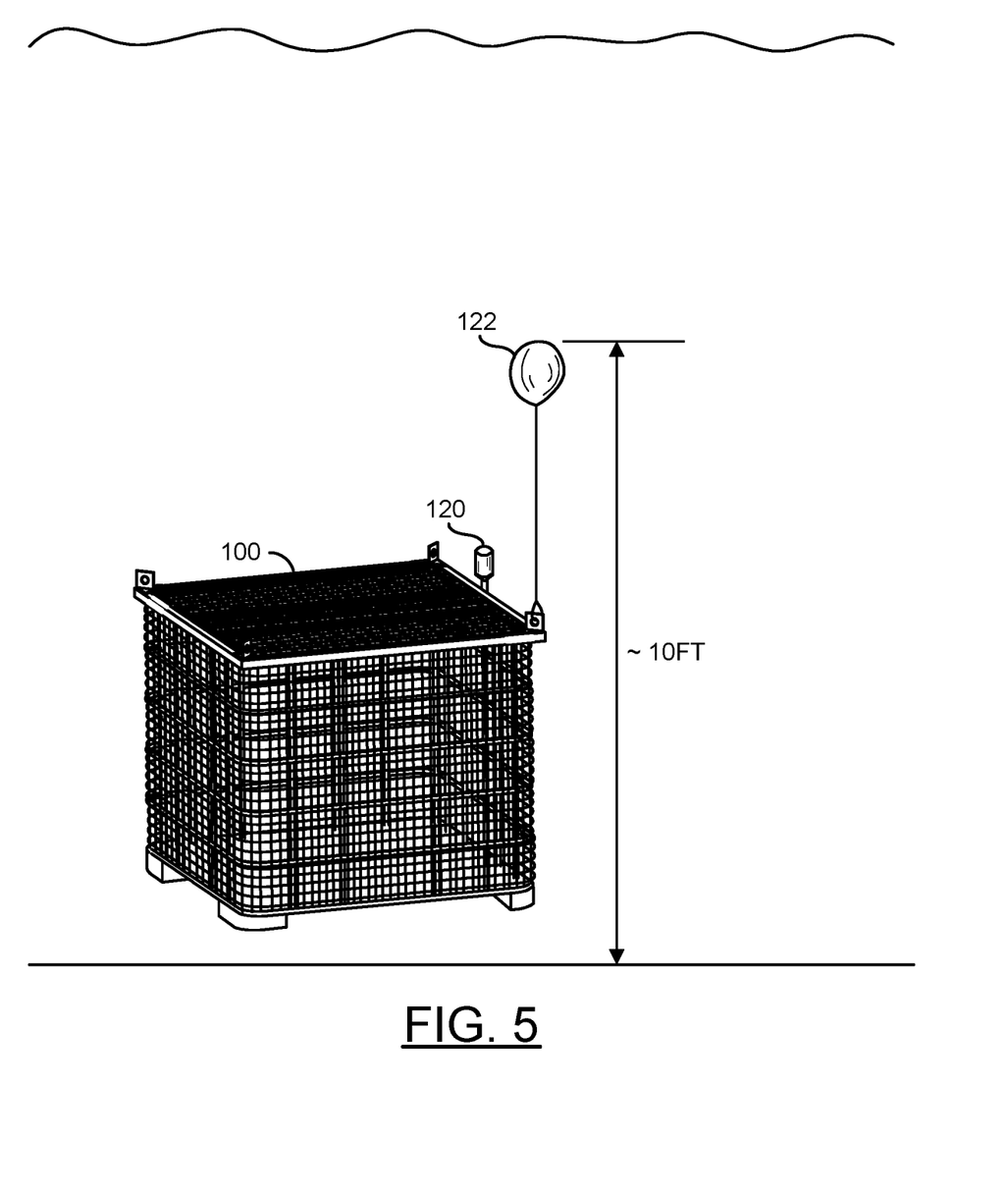
FIG. 5 is a diagram illustrating an example application of the enclosure of FIG. 1.

Referring to FIG. 5, a diagram is shown illustrating an example application of the enclosure of FIG. 1. In an example, the enclosure 100 encasing numerous bottles of liquid (e.g., alcoholic beverages, olive oil, etc.) may be submerged in seawater by placing the enclosure 100 on the bottom of a body of seawater. After a predetermined amount of time has passed, the enclosure 100 may be recovered. In an example, the optional light emitting device 120 may be used as a marker for finding the submerged enclosure 100. In another example, a buoy 122 may be used to assist in finding the enclosure 100. In still another example, the buoy 122 may be implemented including the optional light emitting device 120. In an example, the buoy 122 may be configured to float about 10 feet above the ocean floor. However, other buoy heights may be used to meet the design criteria of a particular implementation.

The enclosure 100 is generally submerged to a depth of 50 to 100 feet. The depth is generally selected to reduce (or prevent) exposure of the bottles 110 to ultraviolet (UV) light (radiation). UV light can degrade beer, wine, spirits and olive oil. The depth of the water generally keeps the UV radiation from reaching the bottles 110 encased in the enclosure 100. The depth of the water also keeps oxygen from reaching the bottles 110. The depth is generally selected not to exceed 2 atmospheres of pressure to guarantee the integrity of the bottles 110. Exposing the bottles of beer, wine, spirits, olive oil, etcetera to marine water currents gently vibrates the bottles during the period of submersion, which helps to prevent sedimentation in the bottles 110. The consistent temperature of the ocean at these depths helps to keep the particular product contained in the bottles 110 in good condition.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an outer cage comprising bars of a first material, said bars forming a grid with a first spacing;
   an inner cage comprising a mesh of said first material, said inner cage disposed within said outer cage and configured to hold a plurality of bottles in a stacked arrangement, said mesh comprising a grid with a second spacing smaller than said first spacing; and
   an array of electrodes comprising a second material and disposed within said inner cage, wherein said array of electrodes is configured to separate said bottles, when stacked in said inner cage, into at least two groups.

2. The apparatus according to claim 1, wherein said first material and said second material are selected to form a galvanic current when submerged in seawater.

3. The apparatus according to claim 1, wherein said inner cage and said array of electrodes are electrically connected.

4. The apparatus according to claim 1, wherein said inner cage and said array of electrodes are electrically connected by a light generating device.

5. The apparatus according to claim 1, wherein said inner cage is configured to allow said bottles to shift position in response to current motion when said apparatus is submerged in seawater.

6. The apparatus according to claim 5, wherein, when apparatus is submerged in seawater, said inner cage is configured to allow said bottles to rub against one another in response to said current motion.

7. The apparatus according to claim 1, wherein said first material comprises non-galvanized metal and said second material comprises zinc.

8. The apparatus according to claim 1, further comprising one or more attachment points.

9. The apparatus according to claim 8, wherein said attachment points are configured to facilitate raising and lowering said apparatus out of and into seawater.

10. The apparatus according to claim 9, wherein a marker is attached to at least one of said attachment points to facilitate locating said apparatus when submerged in said seawater.

11. The apparatus according to claim 10, wherein said marker comprises a buoy.

12. The apparatus according to claim 1, wherein said bottles are glass bottles containing at least one of wine, beer, spirits, or olive oil.

13. The apparatus according to claim 1, wherein said inner cage is configured to limit an amount of movement of said bottles to prevent breakage.

14. A method of accelerating an aging process of an alcoholic beverage comprising:
   stacking a plurality of bottles containing said alcoholic beverage within an inner cage comprising a mesh of a first material, wherein (i) said inner cage is disposed within an outer cage comprising bars of said first material, (ii) said bars of said outer cage form a grid with a first spacing, (iii) said mesh of said inner cage comprises a grid with a second spacing smaller than said first spacing, and (iv) an array of electrodes comprising a second material is disposed within said inner cage, said array of electrodes being configured to separate said bottles into at least two groups; and
   submerging said inner and outer cages and said bottles in seawater for a predefined period of time.

15. The method according to claim 14, wherein said first material and said second material are selected to form a galvanic current when submerged in said seawater.

16. The method according to claim 14, wherein, when submerged in seawater, said inner cage is configured to allow said bottles to shift position in response to seawater motion.

17. The method according to claim 16, wherein, when submerged in said seawater, said inner cage is configured to allow said bottles to rub against one another in response to said seawater motion.

18. The method according to claim 14, wherein said first material comprises non-galvanized metal and said second material comprises zinc.

19. The method according to claim 14, wherein said bottles are glass bottles containing at least one of wine, beer, or spirits.

20. The method according to claim 14, wherein said inner cage is configured to limit an amount of movement of said bottles to prevent breakage.

* * * * *